United States Patent [19]

Bidlack

[11] 3,888,656

[45] June 10, 1975

[54] CHEMICAL TREE-PRUNING METHOD

[75] Inventor: Harvey D. Bidlack, Shepherd, Mich.

[73] Assignee: The Dow Chemical Company, Midland, Mich.

[22] Filed: Dec. 17, 1973

[21] Appl. No.: 425,391

[52] U.S. Cl. .......................................... 71/94; 71/78
[51] Int. Cl.² .......................................... A01N 9/22
[58] Field of Search ................................... 71/94, 78

[56] References Cited
UNITED STATES PATENTS

| | | | |
|---|---|---|---|
| 2,734,815 | 2/1956 | Mowry et al. | 71/94 |
| 3,506,433 | 4/1970 | Abramitis et al. | 71/78 |
| 3,620,712 | 11/1971 | Conklin | 71/78 |

OTHER PUBLICATIONS

Thomas, "Quat. Ammonium Compounds IV etc.," (1962), J. Med. Chem. 6, pp. 456–457 (1963).

*Primary Examiner*—Glennon H. Hollrah
*Attorney, Agent, or Firm*—Theodore Post; C. Kenneth Bjork

[57] ABSTRACT

Naphtho(2,1-b)quinolizinium bromide when applied to trees causes a constriction to occur in the apical region such that new growth from the apicies of the treated branches hang downward vertically from the usual positions so that even moderate air movement readily breaks off such new growth to maintain the treated trees at a desired height.

1 Claim, No Drawings

CHEMICAL TREE-PRUNING METHOD

BACKGROUND OF THE INVENTION

Naphtho(2,1-b)quinolizinium bromide is old; J. Med. Chem. 6: 456 (1963). However, its use as a chemical tree-pruning agent or the use of any chemical compound as a chemical tree-pruning agent is novel.

SUMMARY OF THE INVENTION

Naphtho(2,1-b)quinolizinium bromide (hereinafter referred to as NQB) when applied to tree branches, advantageously as an aqueous spray containing an effective amount of NQB, causes a constriction in lateral growth in the apical region such that new growth from the apicies of the treated branches hangs downward vertically from the usual position. Consequently, in the presence of a light breeze or stronger air movement, such new growth readily snaps off, so that a tree can be maintained at a desired height. By an effective amount of NQB is meant an amount from about 0.2 to 8 pounds per acre applied in a convenient volume of solution.

The compound is advantageously dissolved in acetone or other organic solvent which, when diluted to a concentration used as an aqueous spray, is non-phytotoxic. Solutions of NQB are advantageously applied by spraying with a conventional agricultural sprayer to run off. The spray is applied advantageously in early spring or when the tree is no longer in a dormant state.

DESCRIPTION OF THE PREFERRED EMBODIMENT

The following additional description and example further describes the invention and the manner and process of making and using it to enable the art skilled to make and use the same, and sets forth the best mode contemplated by the inventor of carrying out the invention.

EXAMPLE

An aqueous spray containing 2,000 p.p.m. of NQB was applied to the foliage of eight Chinese elm trees ranging in height between 8 and 12 inches and having 3 to 6 inches of new growth, including well-expanded new leaves. After 6 weeks, all new growth ranging between 3 and 6 inches in length from the apicies of the treated branches drooped downward vertically. In the presence of a light breeze or wind, the drooping new growth snapped off, so that the treated trees were no taller than they were at treatment time, whereas untreated control trees were taller by the amount of their new growth.

The process of this invention is equally applicable to fruit or ornamental trees of any kind, e.g., apple, pear, peach, plum and cherry trees as well as oak, maple, birch and similar trees.

What is claimed is:

1. A method useful for chemically pruning trees which comprises applying to the upper branches of a growing tree an effective amount of naphtho(2,1-b)quinolizinium bromide whereby a constriction is caused to occur in the apical region so that the new growth from the apices of the treated branches occurs beyond a constriction and droops downward vertically, whereby a light breeze or stronger air movement breaks off the downwardly drooping new growth.

* * * * *